US009080622B2

(12) United States Patent
Edler et al.

(10) Patent No.: US 9,080,622 B2
(45) Date of Patent: Jul. 14, 2015

(54) HYDRAULIC COUPLING HAVING SELF-ADJUSTING ANTI-ROTATION HYDRAULIC FLUID PATH

(75) Inventors: Andrew Nathan Edler, Homer, MI (US); Daniel Philip Fisher, Coldwater, MI (US); Matthew George Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 1596 days.

(21) Appl. No.: 12/417,804

(22) Filed: Apr. 3, 2009

(65) Prior Publication Data

US 2010/0251706 A1 Oct. 7, 2010

(51) Int. Cl.
| | |
|---|---|
| *F16H 48/22* | (2006.01) |
| *F16D 43/284* | (2006.01) |
| *F16H 48/32* | (2012.01) |
| *F16D 25/12* | (2006.01) |
| *F16D 25/08* | (2006.01) |

(52) U.S. Cl.
CPC ............ *F16D 43/284* (2013.01); *F16D 25/082* (2013.01); *F16D 25/12* (2013.01); *F16H 48/22* (2013.01); *F16H 48/32* (2013.01)

(58) Field of Classification Search
USPC ............... 475/23, 88, 86, 84, 231; 192/85.49, 192/85.59
See application file for complete search history.

(56) References Cited

U.S. PATENT DOCUMENTS

| | | | | |
|---|---|---|---|---|
| 3,670,770 | A |  | 6/1972 | Nelson ...................... 137/614.04 |
| 4,240,654 | A | * | 12/1980 | Gladieux ...................... 285/276 |
| 4,538,679 | A |  | 9/1985 | Hoskins et al. ............... 165/178 |
| 4,976,667 | A | * | 12/1990 | Goscenski, Jr. ................. 475/86 |
| 5,340,168 | A | * | 8/1994 | Barker .......................... 285/276 |
| 5,749,606 | A |  | 5/1998 | Lu et al. ........................... 285/86 |
| 5,779,280 | A | * | 7/1998 | Hedman .................... 285/124.4 |
| 5,888,163 | A |  | 3/1999 | Shaffer et al. ................... 475/88 |
| 5,938,558 | A |  | 8/1999 | Eybergen et al. ............. 475/231 |
| 6,019,204 | A | * | 2/2000 | Meyer ...................... 192/85.49 |
| 6,332,522 | B1 |  | 12/2001 | Morse et al. ..................... 192/85 |
| 7,004,509 | B2 | * | 2/2006 | Beach et al. .................. 285/281 |
| 7,104,912 | B2 |  | 9/2006 | Morgensai ..................... 475/231 |
| 7,357,749 | B2 |  | 4/2008 | Nofzinger et al. ............. 475/231 |
| 7,438,167 | B2 |  | 10/2008 | Morgensai et al. ............. 192/85 |
| 2003/0067164 | A1 | * | 4/2003 | Hoffman et al. ............... 285/322 |
| 2003/0224896 | A1 | * | 12/2003 | Chung .......................... 475/231 |

FOREIGN PATENT DOCUMENTS

DE      44 42 117 A1    5/1996

OTHER PUBLICATIONS

Apr. 1, 2011 International Search Report and Written Opinion for PCT/US2010/041509.

\* cited by examiner

*Primary Examiner* — Ramya Burgess
*Assistant Examiner* — Lillian Nguyen
(74) *Attorney, Agent, or Firm* — Remarck Law Group PLC

(57) ABSTRACT

A hydraulic coupling for use in a vehicle drive train having a fluid path which extends between the housing of the hydraulic coupling and a coupling mechanism. The fluid path includes a first aperture formed in the housing with a first diameter and a longitudinal axis, as well as a second aperture formed in the coupling mechanism. A rigid conduit extends between the first and second apertures with a first portion having a diameter that is less than the first diameter of the first aperture so as to define an adjustment gap that allows the rigid conduit to move out of alignment with the longitudinal axis in response to misalignment between the first and second apertures. In addition, the rigid conduit provides resistance to torque imposed upon the coupling mechanism.

20 Claims, 3 Drawing Sheets

HYDRAULIC COUPLING HAVING SELF-ADJUSTING ANTI-ROTATION HYDRAULIC FLUID PATH

BACKGROUND OF THE INVENTION

1. Field of the Invention

The present invention relates, generally, to hydraulic couplings and, more specifically, to a hydraulic coupling having a self-adjusting fluid delivery path with anti-rotational capabilities.

2. Description of the Related Art

Hydraulic couplings are well-known devices used in vehicle drive trains. Typically, hydraulic couplings are operatively supported within a housing and are in fluid communication with a source of hydraulic fluid. These devices operate to couple a pair of rotating members, such as drive shafts or axle half shafts about a rotational axis. Thus, hydraulic couplings have been employed as a part of transfer cases that operatively couple the front and rear axles of a vehicle, in limited slip and locking differentials used to couple axle half shafts, as well as other applications commonly known in the art.

Hydraulic couplings of the type known in the related art may include a gear box supported by the housing and that include a gear set designed to allow for relative rotation between the rotary members coupled together by the hydraulic coupling. In addition, these devices also include a coupling mechanism, such as a clutch pack, that operate to lock the rotary members for rotation together. Hydraulic fluid is used to actuate a piston or a like device to engage the clutch and therefore couple the rotating members together. Typically, the gear box is supported for rotation within the housing, but the coupling mechanism is not. Rather, the coupling mechanism may be supported upon one of the rotary members via roller bearings or the like. Nevertheless, because it is supported upon a rotary member and usually adjacent the rotating gear box, and because it acts to couple the rotary members together, the coupling mechanism is subjected to torque during normal operating conditions. When the source of pressurized hydraulic fluid is located outside of the coupling mechanism, for example, it must be delivered through the stationary housing to the coupling mechanism. There are generally two ways to deliver pressurized fluid in these circumstances.

One approach is to use a flexible tube that may be bent or flexed to establish the fluid connection between the outer housing and the coupling mechanism. However, this approach suffers from the disadvantage that there is no "anti-rotation" feature of the tube. Accordingly, where flexible tubing is employed, the hydraulic coupling must also include anti-rotation tabs or special mounting structure that is used to stabilize the coupling mechanism relative to the gear box as well as the outer housing. This necessitates that the coupling mechanism as well as the gear box be assembled in a particular way to align these component parts of the hydraulic coupling in a particular way. This increases the complexity of the hydraulic couplings known in the related art as well as the cost of manufacturing them.

Another approach for delivering pressurized hydraulic fluid to the coupling mechanism is to employ a rigid tube that extends from the outer housing to the coupling mechanism. A rigid tube provides anti-rotational aspects to the system and helps the coupling mechanism resist torque imposed through this system. However, because this approach is also "rigid" all associated apertures and mounting points for the fluid path must be very accurately located. Slight deviations from design in the location of the aperture can create difficulties during the manufacturing process. This increases the cost associated with manufacturing both the housing as well as the coupling mechanism. In addition, it also complicates the assembly of the device.

Thus, there remains a need in the art for a hydraulic coupling having a fluid path that is flexible and self-adjusting such that the corresponding apertures formed in the housing as well as the coupling mechanisms do not have to be located with extreme precision. In addition, there remains a need in the art for a hydraulic coupling having a fluid path that has anti-rotational aspects so as to eliminate the need for anti-rotation tabs or other specific mechanisms used to mount the coupling mechanism to the housing. In addition, there remains a need in the art for a hydraulic coupling having a fluid path that allows for significant misalignment between the interior mounting points and the exterior mounting points for the fluid path.

SUMMARY OF THE INVENTION

The present invention overcomes the disadvantages in the related art in a hydraulic coupling for use in a vehicle drive train including a pair of rotary members. The hydraulic coupling includes a housing that is in fluid communication with a source of pressurized fluid. A gear case is supported for rotation by the housing and is operatively coupled to the rotary members. A coupling mechanism is non-rotatably supported within the housing and adjacent the gear case. The coupling mechanism is operable to selectively couple the pair of rotary members together. A fluid path extends between the housing and the coupling mechanism. The fluid path includes a first aperture formed in the housing and having a first diameter and a longitudinal axis, as well as a second aperture formed in the coupling mechanism. A rigid conduit having a first portion extends through the first aperture in the housing with a diameter less than the first diameter of the first aperture so as to define an adjustment gap so that the rigid conduit can move out of alignment with the longitudinal axis in response to a misalignment between the first and second apertures. In addition, the rigid conduit includes a second portion that is sealingly received in frictional engagement with the second aperture in the coupling mechanism such that the rigid conduit provides resistance to torque imposed upon the coupling mechanism.

In this way, the hydraulic coupling of the present invention provides a fluid path that is flexible and self-adjusting such that corresponding apertures formed in the housing as well as the coupling mechanism do not have to be located with extreme precision. In addition, the hydraulic coupling of the present invention has a fluid path that has anti-rotational aspects so as to eliminate the need for anti-rotation tabs or other specific mechanisms used to mount the coupling mechanism to the housing. Thus, the hydraulic coupling of the present invention has a fluid path that allows for significant misalignment between the interior mounting points and the exterior mounting points for the fluid path while at the same time providing anti-rotational features thereto.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
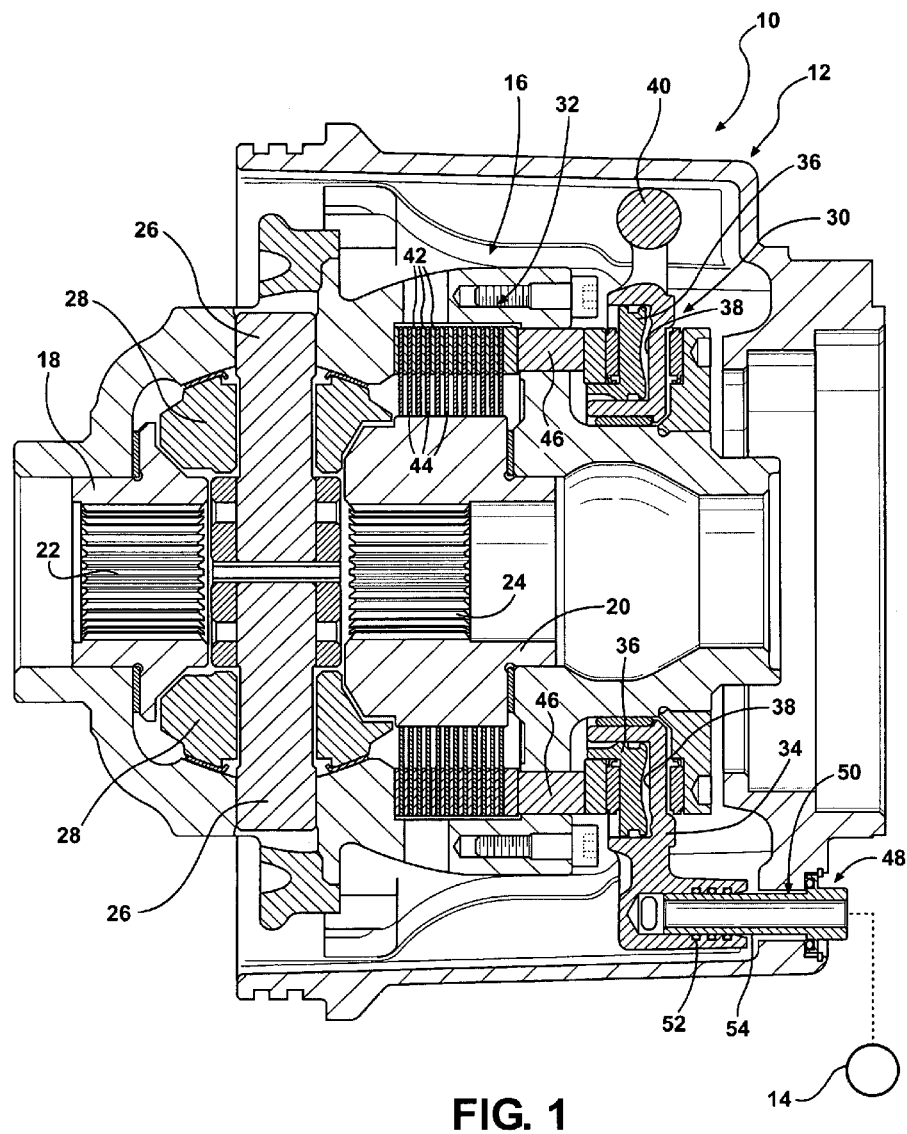
FIG. 1 is a cross-sectional side view of the hydraulic coupling of the present invention.

A representative example of a hydraulic coupling for use in a vehicle drive train is generally indicated at 10 in FIG. 1, where like numerals are used to designate like structure throughout the drawings. Those having ordinary skill in the art will recognize that hydraulic couplings may be employed as a part of transfer cases that operatively couple the front and rear axles of a vehicle; as a part of limited slip, or locking differentials used to couple axle half shafts; as well as other applications in vehicle drive trains as is commonly known in the art. Thus, those having ordinary skill in the art will appreciate from the description that follows that the purpose of the figures is to illustrate one example of the present invention, and are not meant to limit it.

Figure 2:
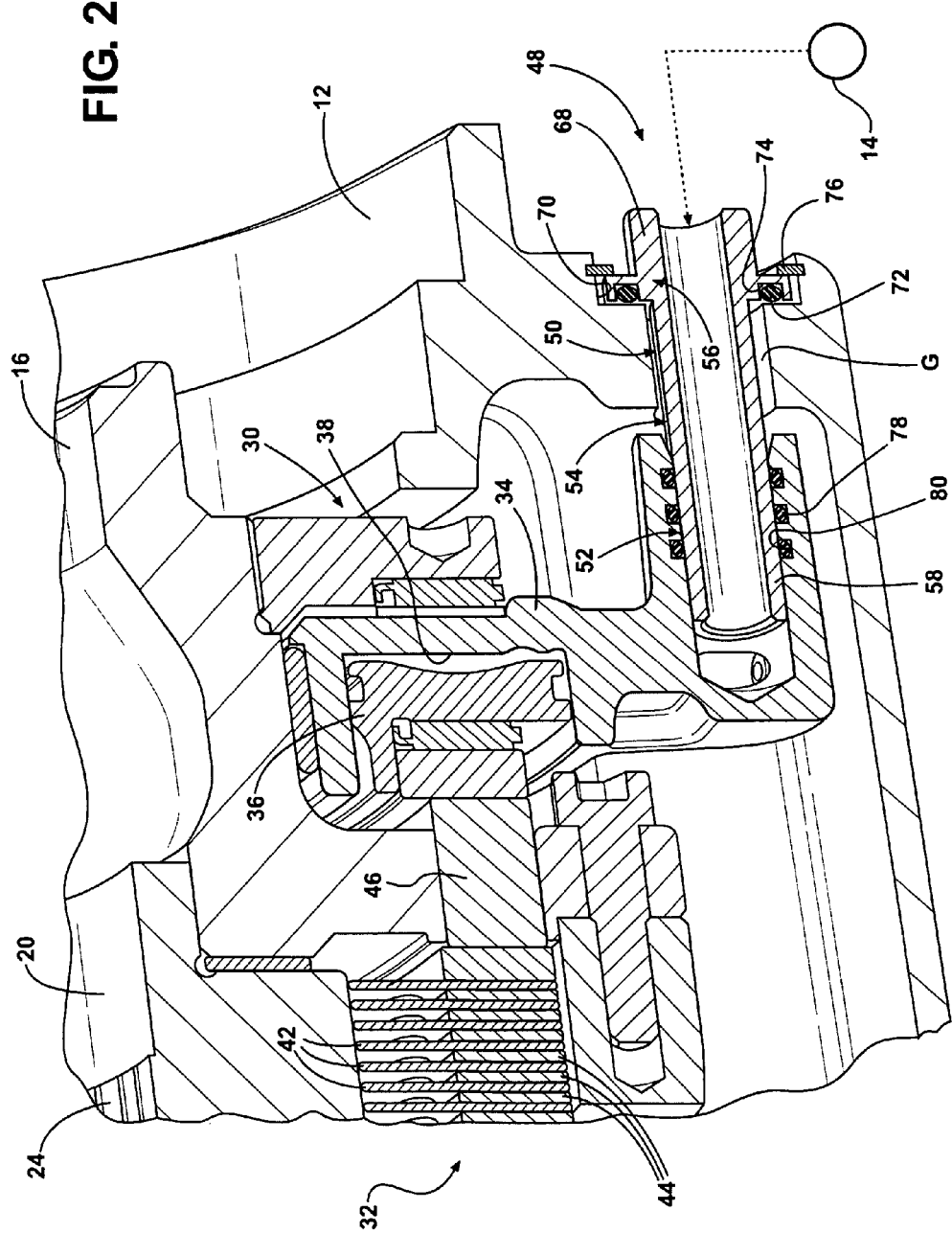
FIG. 2 is a partial cross-sectional side view of the hydraulic coupling of the present invention illustrating the coupling mechanism and the fluid path.

As noted above, the hydraulic coupling 10 is used in a vehicle drive train that includes a pair of rotary members. To this end, the hydraulic coupling includes a housing, on one half of which is generally indicated at 12, that is in fluid communication with a source of pressurized fluid, schematically illustrated at 14 in FIGS. 1-2. The source of pressurized fluid 14 may include a primary pump used to lubricate and cool various components of the vehicle drive train or any other suitable source of pressurized hydraulic fluid as is commonly known in the art. A gear case, generally indicated at 16, is supported for rotation within the housing 14. To this end, the gear case may be driven through a pinion gear by a drive axle or a vehicle prop shaft, as the case may be. A pair of side gears 18, 20 is also mounted for rotation with respective ones of the rotary members in the gear case 16. Thus, each of the pair of side gears 18, 20 includes a splined inner diameter 22, 24 that is adapted to cooperate with corresponding splines (not shown) on the rotary members.

In the representative example illustrated in these figures, the hydraulic coupling 10 also functions as a differential. However, and as noted above, the hydraulic coupling 10 of the present invention is not limited to this particular application. In any event, a cross pin 26 is fixedly mounted to the gear case 16 for rotation therewith. A pair of pinion gears 28 are mounted for rotation on the cross pin and in meshing relationship with gear teeth formed on each of the pair of side gears 18, 20. The side gears 18, 20 and pinion gears 28 cooperate to provide differential rotation between the rotary members as is commonly known in the art.

In addition, the hydraulic coupling 10 of the present invention includes a coupling mechanism, generally indicated at 30, that is non-rotatably supported within the housing 12 and adjacent to the gear case 16. The coupling mechanism 30 is operable to selectively couple the pair of rotary members together. In this context, the hydraulic coupling 10 of the present invention may embody a limited slip differential or a locking differential. Thus, the coupling mechanism 10 of the present invention may be operable to allow relative rotation between the pair of rotary members under certain circumstances and then act to lock the rotary members together under other operational conditions.

To this end, the hydraulic coupling 10 of the present invention also includes a clutch assembly, generally indicated at 32, having an open position wherein the side gears 18, 20 may rotate at different speeds and a closed position wherein the hydraulic coupling 10 is locked so that the side gears 18, 20 rotate at substantially the same speed. The coupling mechanism 30 includes a housing 34 and a piston 36 movably supported within the housing 34. The piston 36 and the housing 34 act to define an expandable chamber 38 therebetween. The expandable chamber 38 is in fluid communication with the source of pressurized fluid 14 as will be described in greater detail below. The housing 34 of the coupling mechanism 30 may also include a purge fitting 40 that is employed for a one-time purging of air when the system is initially charged as is commonly known in the art.

More specifically, the clutch assembly 32 includes a plurality of annular plates 42 that are splined at their outer diameter to the gear case 16. In addition, the clutch assembly 32 includes a plurality of annular friction disks 44 that are splined at their inner diameter to one of the pair of side gears 18 or 20. In the representative example illustrated herein, the annular friction disks 44 are splined at their inner diameter to the side gear 20. However, those having ordinary skill in the art will appreciate that the annular friction disks 44 may be supported for rotation by either of the side gears 18 or 20, or both. The plurality of annular plates 42 and annular friction disks 44 are interleaved between one another and act to rotate past one another in substantially non-contacting relationship when the clutch assembly 32 is in its open position. On the other hand, the annular plates 42 and friction disks 44 are axially movable upon their splined interconnections into frictional engagement relative to one another thereby reducing relative rotation between the annular plates 42 and disks 44 when the clutch assembly 32 is in its closed position. Thus, when the clutch assembly 32 is in its closed position, the side gears 18, 20 rotate together.

The clutch assembly 32 includes a transfer pin 46 that extends between the piston 36 and the plurality of interleaved annular plates 42 and friction disks 44. The transfer pin 46 is responsive to movement of the piston 36 to move the clutch assembly 32 from its open position to its closed position as will be described in greater detail below.

Figure 3:
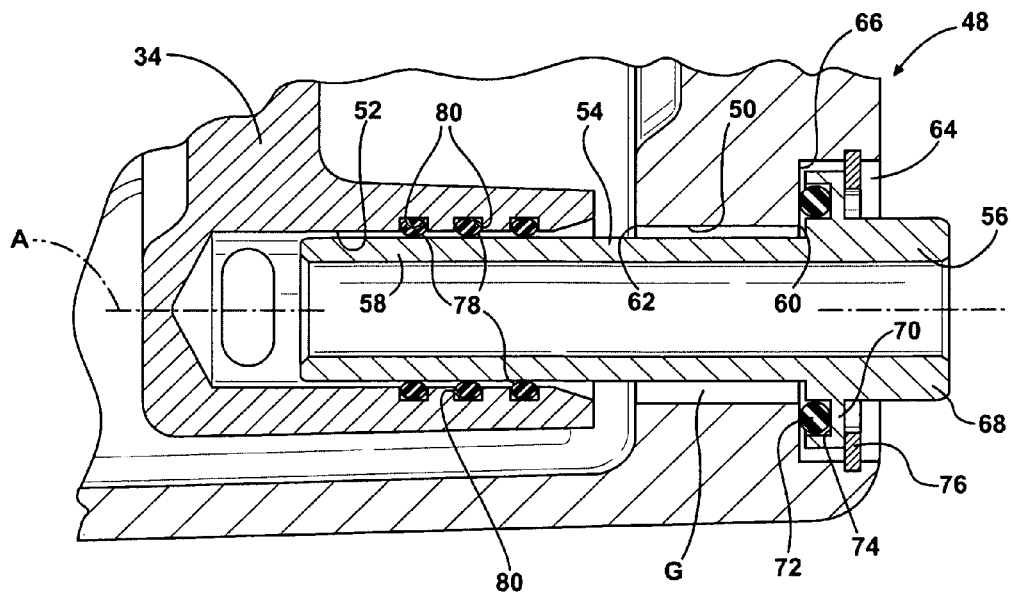
FIG. 3 is an enlarged cross-sectional side view of the fluid path of the present invention.
Figure 4:
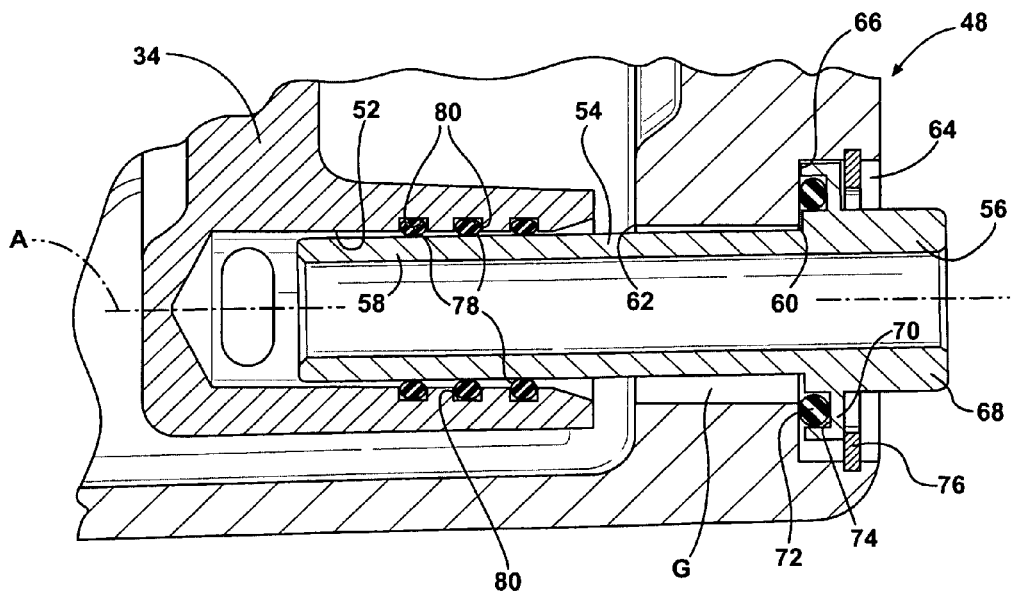
FIG. 4 is an enlarged cross-section of the fluid path of the present invention illustrating the rigid conduit in a skewed position.

The hydraulic coupling 10 of the present invention also includes a fluid path, generally indicated at 48, that is in communication with the source of pressurized fluid 14 and that extends between the housing 12 and the coupling mechanism 30. As best shown in FIGS. 3 and 4, the fluid path 48 includes a first aperture, generally indicated at 50, formed in the housing 12 and having a first diameter and a longitudinal axis A. In addition, the fluid path 48 includes a second aperture 52 that is formed in the coupling mechanism 30. A rigid conduit 54 extends between the first aperture 50 and the second aperture 52 as is described in greater detail below.

More specifically, the rigid conduit 54 has a first portion 56 that extends through the first aperture 50 in the housing 12 and has a diameter that is less than the first diameter of the first aperture 50. Thus, the first portion 56 of the rigid conduit and the first diameter of the first aperture 50 define an adjustment gap G. This gap G facilitates the rigid conduit's 54 movement out of alignment with the longitudinal axis A in response to a misalignment between the first and second apertures 50, 52 as shown in FIG. 4. The rigid conduit 54 also includes a second portion 58 that is sealingly received in frictional engagement with the second aperture 52 in the coupling mechanism 30. Because of its relative stiffness, the rigid conduit 54 provides resistance to torque imposed on the coupling mechanism 30, as will be described in greater detail below.

With continuing reference to FIGS. 3 and 4, the first aperture 50 in the housing 12 includes an inlet 60 and an outlet 62 with the longitudinal axis A extending therebetween. The housing 12 also includes a pre-chamber 64 having a base 66 that is defined adjacent to the inlet 60 of the first aperture 50. The pre-chamber 64 has a diameter that is greater than the first diameter of the first aperture 50. The rigid conduit 54 includes a head portion 68 that is received in the pre-chamber 64 in abutting relationship with the base 66 and adjacent to the inlet 60 to the first aperture. More specifically, the first portion 56 of the rigid conduit 54 includes an annular shoulder 70 and a sealing member 72 disposed between the annular shoulder 70 and the housing 12. The shoulder 70 extends annularly about the head portion 68 of the rigid conduit 54. The shoulder 70 defines an annular, U-shaped cavity 74. The sealing member 72 may include an O-ring, gasket, or the like that is received in the annular U-shaped cavity 74 and disposed in sealing relationship with the base 66 of the pre-chamber 64. To this end, the fluid path 48 may also include a fastener 76 that is disposed about the shoulder 70 opposite the sealing member 72 so as to fix the head 68 and the shoulder 70 in abutting and sealing contact with the base 66 of the pre-chamber 64. The fastener 76 may be selected from a group including a snap ring, jam nut, press fit ring or the like. However, those having ordinary skill in the art will recognize that any suitable fastener commonly known in the related art may be employed for this purpose.

The fluid path 48 also includes at least one sealing member 78 that is disposed between the second portion 58 of the rigid conduit 54 and the second aperture 52 formed in the coupling mechanism 30. More specifically, and in the representative embodiment illustrated herein, the sealing member may include a series of sealing members 78 that are disposed in longitudinal spaced relationship with respect to each other about the outer circumference of the second portion 58 of the rigid conduit 54. To this end, the second aperture 52 may include a series of annular grooves 80 with each of the sealing members 78 disposed in the annular grooves 80 in abutting sealing contact with the second portion 58 of the rigid conduit 54. The second aperture 52 establishes fluid communication between the expandable chamber 38 and the source of pressurized fluid 14. Thus, the piston 36 is movable in response to a bias created by the pressurized fluid in the expandable chamber 38 from a first position wherein the clutch assembly 32 is in its opened position and a second position wherein the piston 36 moves the transfer pin 46 and thus the clutch assembly 32 to its closed position so that the side gears 18, 20 rotate together.

Because of the adjustment gap defined between the first portion 56 of the rigid conduit 54 and the first aperture 50, the fluid path 48 of the present invention is flexible and self-adjusting. In this way, the first and second apertures 50, 52 formed in the housing 12 and the coupling mechanism 30 do not have to be located with extreme precision. This adjustment capability is best illustrated in FIG. 4 where the rigid conduit 54 is shown skewed relative to the longitudinal axis A. In this way, the hydraulic coupling 10 of the present invention having a fluid path 48 that allows for significant misalignment between the interior mounting points and the exterior mounting points of the fluid path 48 significantly reduces the cost of manufacture of this device. In addition, because the conduit 54 is rigid, the fluid path established between the first and second apertures 50, 52 resists relative rotation of the housing 34 of the coupling mechanism 30 relative to the gear case 16. Accordingly, this feature acts to eliminate the need for anti-rotation tabs or other specific mechanisms used to mount the coupling mechanism 30 to the housing 12. In this way, the cost to manufacture the hydraulic coupling 10 of the present invention is further reduced.

The invention has been described in great detail in the foregoing specification, and it is believed that various alterations and modifications of the invention will become apparent to those having ordinary skill in the art from a reading and understanding of the specification. It is intended that all such alterations and modifications are included in the invention, insofar as they come within the scope of the appended claims.

We claim:

1. A hydraulic coupling for use in a vehicle rive train including a pair of rotary members, said hydraulic coupling comprising:
    a housing in fluid communication with a source of pressurized fluid;
    a gear case supported for rotation by said housing and operatively coupled to the rotary members;
    a coupling mechanism non-rotatably supported within said housing and adjacent said gear case, said coupling mechanism operable to selectively couple the pair of rotary members together;
    a fluid path extending between said housing and said coupling mechanism, said fluid path including a first aperture formed in said housing and having a first diameter at a longitudinal axis, a second aperture formed in said coupling mechanism, a rigid conduit having a first portion extending through said first aperture in said housing and having a diameter less than said first diameter of said first aperture so as to define an adjustment gap such that said rigid conduit can move out of alignment with said longitudinal axis in response to a misalignment between said first and second apertures, and a second portion that is sealingly received in frictional engagement in said second aperture in said coupling mechanism such that said rigid conduit provides resistance to torque imposed upon said coupling mechanism.

2. A hydraulic coupling as set forth in claim 1 wherein said first aperture includes an inlet and an outlet with said longitudinal axis extending therebetween.

3. A hydraulic coupling as set forth in claim 2 wherein said housing includes a pre-chamber having a base defined adjacent said inlet to said first aperture, said pre-chamber having a diameter greater than said first diameter of said first aperture.

4. A hydraulic coupling as set forth in claim 3 wherein said rigid conduit includes a head portion received in said pre-chamber in abutting relationship with said base and adjacent said inlet to said first aperture.

5. A hydraulic coupling as set forth in claim 4 wherein said first portion of said rigid conduit includes an annular shoulder and a sealing member disposed between said annular shoulder and said housing.

6. A hydraulic coupling as set forth in claim 5 wherein said shoulder extends annularly about said head portion of said rigid conduit.

7. A hydraulic coupling as set forth in claim 6 further including a fastener disposed about said shoulder opposite said sealing member so as to fix said head and said shoulder in abutting and sealing contact with said annular base of said pre-chamber.

8. A hydraulic coupling as set forth in claim 7 wherein said shoulder defines a annular, U-shaped cavity, said seating member including an O-ring received within said annular U-shaped cavity and disposed in sealing relationship with said base of said pre-chamber.

9. A hydraulic coupling as set forth in claim 7 wherein said fastener may be selected from a group including a snap ring, jam nut and press fit ring.

10. A hydraulic coupling as set forth in claim 1 wherein said fluid path includes at least one sealing member disposed between said second portion of said rigid conduit and said second aperture formed in said coupling mechanism.

11. A hydraulic coupling as set forth in claim 10 wherein said at least one sealing mechanism includes a series of sealing members disposed in longitudinally spaced relationship with respect to each other about the outer circumference of said second portion of said rigid conduit.

12. A hydraulic coupling as set forth in claim 11 wherein said second aperture includes a series of annular grooves, said series of sealing members disposed in said annular grooves in abutting sealing contact with said second portion of said rigid conduit.

13. A hydraulic coupling as set forth in claim 1 further including a pair of side gears mounted for rotation with a respective one of the rotary members in said gear case and a clutch assembly having an open position wherein said side gears may rotate at different speeds and a closed position wherein said hydraulic coupling is locked so that side gears rotate at substantially the same speed.

14. A hydraulic coupling as set forth in claim 13 wherein said coupling mechanism includes a housing and a piston movably supported within said housing and defining an expandable chamber between said piston and said housing, said second aperture establishing fluid communication between said expandable chamber and the source of pressurized fluid, said piston movable in response to a bias created by the pressurized fluid in said expandable chamber from a first position wherein said clutch assembly is in its open position and a second position wherein said piston moves said clutch assembly to its closed position so that said side gears rotate together.

15. A hydraulic coupling as set forth in claim 14 wherein said clutch assembly includes a plurality of annular plates splined to said gear case and a plurality of annular friction disks splined to one of said pair of side gears and interleaved between said plurality of annular plates, said annular plates and annular friction disks act to rotate past one another in substantially non-contacting relationship when said clutch assembly is in its opened position and said annular plates and friction disks being axially movable into frictional engagement relative to one another thereby reducing relative rotation between said annular plates and disks when said clutch assembly is in its closed position.

16. A hydraulic coupling as set forth in claim 15 wherein said clutch assembly includes a transfer pin extending between said piston and said plurality of interleaved annular plates and friction disks, said transfer pin responsive to movement of said piston to move said clutch assembly from its opened position to its closed position.

17. A hydraulic coupling as set forth in claim 13 wherein said gear case includes a cross pin fixedly mounted to said gear case for rotation therewith and a pair of pinion gears mounted for rotation on said cross pin and in meshing relationship with each said pair of side gears.

18. A hydraulic coupling for use in a vehicle drive train including a pair of rotary members, said hydraulic coupling comprising:
a housing in fluid communication with a source of pressurized fluid;
a gear case supported for rotation by said housing, a pair of side gears mounted for rotation with the respective one of the rotary members in said gear case, a cross pin fixedly mounted to said gear case for rotation therewith and a pair of pinion gears mounted for rotation on said cross pin and in meshing relationship with each of said pair of side gears, said side gears and pinion gears cooperating to provide differential rotation between the pair of rotary members;
a coupling mechanism nonrotatably supported within said housing and adjacent said gear case, said coupling mechanism operable to selectively couple the pair of rotary members together;
a fluid path extending between said housing and said coupling mechanism, said fluid path including a first aperture formed in said housing and having a first diameter and a longitudinal axis, a second aperture formed in said coupling mechanism, a rigid conduit having a first portion extending through said first aperture in said housing and having a diameter less than said first diameter of said first aperture so as to define an adjustment gap such that said rigid conduit can move out of alignment with said longitudinal axis in response to a misalignment between said first and second apertures, and a second portion that is sealingly received in frictional engagement in said second aperture in said coupling mechanism such that said rigid conduit provides resistance to torque imposed upon said coupling mechanism.

19. A hydraulic coupling as set forth in claim 18 wherein said first aperture includes an inlet and an outlet with said longitudinal axis extending therebetween, said housing including a pre-chamber having a base defined adjacent said inlet to said first aperture, said pre-chamber having a diameter greater than said first diameter of said first aperture, said rigid conduit including a head portion received in said pre-chamber in abutting relationship with said base and adjacent said inlet to said first aperture.

20. A hydraulic coupling as set forth in claim 19 wherein said first portion of said rigid conduit includes an annular shoulder extending about said head portion of said rigid conduit, and defining an annular, U-shaped cavity, a sealing member disposed within said U-shaped cavity between said annular shoulder and said housing and disposed in sealing relationship with said base of said pre-chamber.

* * * * *